(12) United States Patent
Rhemann et al.

(10) Patent No.: US 9,955,140 B2
(45) Date of Patent: Apr. 24, 2018

(54) DISTINGUISHING FOREGROUND AND BACKGROUND WITH INFRAMED IMAGING

(71) Applicant: Microsoft Technology Licensing, LLC, Redmond, WA (US)

(72) Inventors: Christoph Rhemann, Bellevue, WA (US); Emad Barsoum, Sammamsih, WA (US); Yao Shen, Redmond, WA (US); Simon P. Stachniak, Redmond, WA (US); Shahram Izadi, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 203 days.

(21) Appl. No.: 14/645,326

(22) Filed: Mar. 11, 2015

(65) Prior Publication Data

US 2016/0269714 A1 Sep. 15, 2016

(51) Int. Cl.
*H04N 5/33* (2006.01)
*H04N 13/02* (2006.01)
(Continued)

(52) U.S. Cl.
CPC ..... *H04N 13/0214* (2013.01); *G06K 9/00255* (2013.01); *G06K 9/00288* (2013.01);
(Continued)

(58) Field of Classification Search
None
See application file for complete search history.

(56) References Cited

U.S. PATENT DOCUMENTS 6,587,183 B1 * 7/2003 Uomori ............... G01B 11/25
348/E5.058
7,783,075 B2 8/2010 Zhang et al.
(Continued)

FOREIGN PATENT DOCUMENTS

CA 2667066 A1 11/2010

OTHER PUBLICATIONS

Tai, et al., "Chroma-Key Algorithm Based on Combination of K-Means and Confident Coefficients", In International Journal of Information and Electronics Engineering, vol. 4, No. 3, May, 2014, 2 pages.

(Continued)

*Primary Examiner* — Reza Aghevli
(74) *Attorney, Agent, or Firm* — Alleman Hall Creasman & Tuttle LLP (57) ABSTRACT

An initial candidate foreground region is identified within an infrared image that includes pixels exhibiting infrared intensity values within a pre-defined range. A depth of surfaces within the initial candidate foreground region is estimated based on infrared intensity values the pixels of the initial candidate foreground region. The initial candidate foreground region is expanded to an expanded candidate foreground region based on a body-model estimate. The body model estimate is seeded with one or more of the initial candidate foreground region, the depth of surfaces, and/or a face of a human subject identified by facial recognition. Each pixel of the infrared image is identified as either a foreground pixel or a background pixel based on a distance of that pixel relative to the expanded candidate foreground region. Pixels identified as background pixels may be modified within a corresponding visible light image.

20 Claims, 5 Drawing Sheets

(51) Int. Cl.
G06K 9/00 (2006.01)
G06K 9/38 (2006.01)
G06T 7/00 (2017.01)
G06K 9/20 (2006.01)
G06T 7/11 (2017.01)
G06T 7/194 (2017.01)

(52) U.S. Cl.
CPC ..... *G06K 9/00375* (2013.01); *G06K 9/00892* (2013.01); *G06K 9/2018* (2013.01); *G06K 9/38* (2013.01); *G06T 7/11* (2017.01); *G06T 7/194* (2017.01); *H04N 5/33* (2013.01); *G06T 2207/10024* (2013.01); *G06T 2207/10048* (2013.01); *H04N 2213/003* (2013.01)

(56) References Cited

U.S. PATENT DOCUMENTS

| | | | |
|---|---|---|---|
| 8,260,131 | B2 | 9/2012 | Sundstrom |
| 8,593,542 | B2 | 11/2013 | Steinberg et al. |
| 8,823,807 | B2 | 9/2014 | Schinker |
| 8,902,198 | B1* | 12/2014 | Karakotsios ............ G06F 3/017 345/175 |
| 9,055,186 | B2* | 6/2015 | Lin ........................ H04N 7/141 |
| 9,367,951 | B1* | 6/2016 | Gray ...................... G06T 15/20 |
| 2010/0111370 | A1* | 5/2010 | Black ................ G06K 9/00369 382/111 |
| 2013/0038766 | A1* | 2/2013 | Perlman ................. H04N 5/357 348/294 |
| 2013/0222246 | A1* | 8/2013 | Booms ................... G06F 3/017 345/168 |
| 2013/0287257 | A1* | 10/2013 | Dedhia ................ G06K 9/3241 382/103 |
| 2013/0342671 | A1* | 12/2013 | Hummel .............. G06K 9/6202 348/77 |
| 2014/0176565 | A1* | 6/2014 | Adeyoola ............ G06T 19/006 345/473 |
| 2014/0176663 | A1 | 6/2014 | Cutler et al. |
| 2014/0178029 | A1 | 6/2014 | Raheman et al. |
| 2014/0282275 | A1* | 9/2014 | Everitt .................... G06F 3/017 715/863 |
| 2014/0309868 | A1* | 10/2014 | Ricci ....................... B60Q 1/00 701/36 |
| 2014/0369558 | A1* | 12/2014 | Holz ................. G06K 9/00201 382/103 |
| 2015/0029294 | A1* | 1/2015 | Lin ........................ H04N 7/141 348/14.01 |
| 2015/0054734 | A1* | 2/2015 | Raghoebardajal ...... G06F 3/017 345/156 |
| 2015/0189256 | A1* | 7/2015 | Stroetmann ............. G06F 3/011 348/54 |

OTHER PUBLICATIONS

Min, et al., "Graph-Cut Based Background Subtraction Using Visual Hull in Multiveiw Images", In Proceedings of Digital Image Computing: Techniques and Applications, Dec. 1, 2008, 1 page.

Sang, "FPGA Implementation for Real-time Chroma-key Effect Using Coarse and Fine Filter", In Proceedings of International Conference on Computing, Management and Telecommunications, Jan. 21, 2013, 2 pages.

"dropoutGS Professional", Published on: Mar. 1, 2013, Available at http://www.photogreenscreen.com/software/dropoutgs.

Drori, et al., "Interactive Object Segmentation in Video by Fitting Splines to Graph Cuts", In Proceedings of ACM SIGGRAPH, Aug. 8, 2004, 1 page.

Jeremy Rue, "Canon rebel t3i camera", Published on: Jan. 9, 2012, Available at: http://multimedia.journalism.berkeley.edu/tutorials/canon-rebel-t3i/shooting-menus/.

Vosters, et al., "Efficient dense blur map estimation for automatic 2D-to-3D conversion", In Proceedings of Stereoscopic Displays and Applications XXIII, 82882H, Feb. 6, 2012, 2 pages.

"Handbuch der Rechtsformlichkeit, Teil B: Allgemeine Empfehlungen für das Formulieren von Rechtsvorschriften; 1: Sprachliche Gestaltung von Gesetzen und Rechtsverordnungen", http://hdr.bmj.de/page_b.1.html, Jan. 1, 2008, 67 pages. (Submitted with machine translation).

Fanello, S. et al., "Learning to be a Depth Camera for Close-Range Human Capture and Interaction", In Proceedings of the ACM Transactions on Graphics, vol. 33, Issue 4, Jul. 27, 2014, 11 pages.

ISA European Patent Office, International Search Report and Written Opinion issued in PCT Application No. PCT/US2016/018563, dated Jun. 9, 2016, WIPO, 22 pages.

IPEA European Patent Office, Second Written Opinion Issued in PCT Application No. PCT/US2016/018563, dated Feb. 6, 2017, WIPO, 29 pages.

IPEA European Patent Office, International Preliminary Report on Patentability Issued in PCT Application No. PCT/US2016/018563, dated Jun. 23, 2017, WIPO, 30 Pages.

* cited by examiner

DISTINGUISHING FOREGROUND AND BACKGROUND WITH INFRAMED IMAGING

BACKGROUND

Modern communication networks enable people to communicate with each other by sharing video or static imagery. Real-time video conferencing is one example of this form of communication. The proliferation of mobile devices containing cameras, such as smart phones and tablet computers, enable users to capture and share video or static imagery with other users from virtually any location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An initial candidate foreground region is identified within an infrared image that includes pixels exhibiting infrared intensity values within a pre-defined range. A depth of surfaces within the initial candidate foreground region is estimated based on the infrared intensity values of the pixels within the initial candidate foreground region. The initial candidate foreground region is expanded to an expanded candidate foreground region based on a body-model estimate. The body model estimate is seeded with one or more of the initial candidate foreground region, the depth of surfaces, and/or a face of a human subject identified within the initial candidate foreground region by facial recognition. Each pixel of the infrared image is identified as either a foreground pixel or a background pixel based on a distance of that pixel relative to the expanded candidate foreground region. Pixels identified as background pixels may be modified within a corresponding visible light image.

DETAILED DESCRIPTION

Depth imaging may be used in a variety of contexts, such as natural user interfaces for human body-part tracking, green-screening of foreground objects from background objects, and three-dimensional (3D) scanning of objects. Previous approaches for depth imaging have relied upon specialized depth cameras that typically use stereo imaging, structured illumination, and/or time-of-flight to detect depth. These specialized depth cameras have not yet surpassed the ubiquity of conventional two-dimensional (2D) cameras, which are currently integrated into a wide variety of consumer electronics. Reliance upon specialized depth cameras may limit adoption of depth imaging due to considerations of their increased energy consumption, increased computational processing power, increased cost, and device form-factor constraints.

Figure 1:
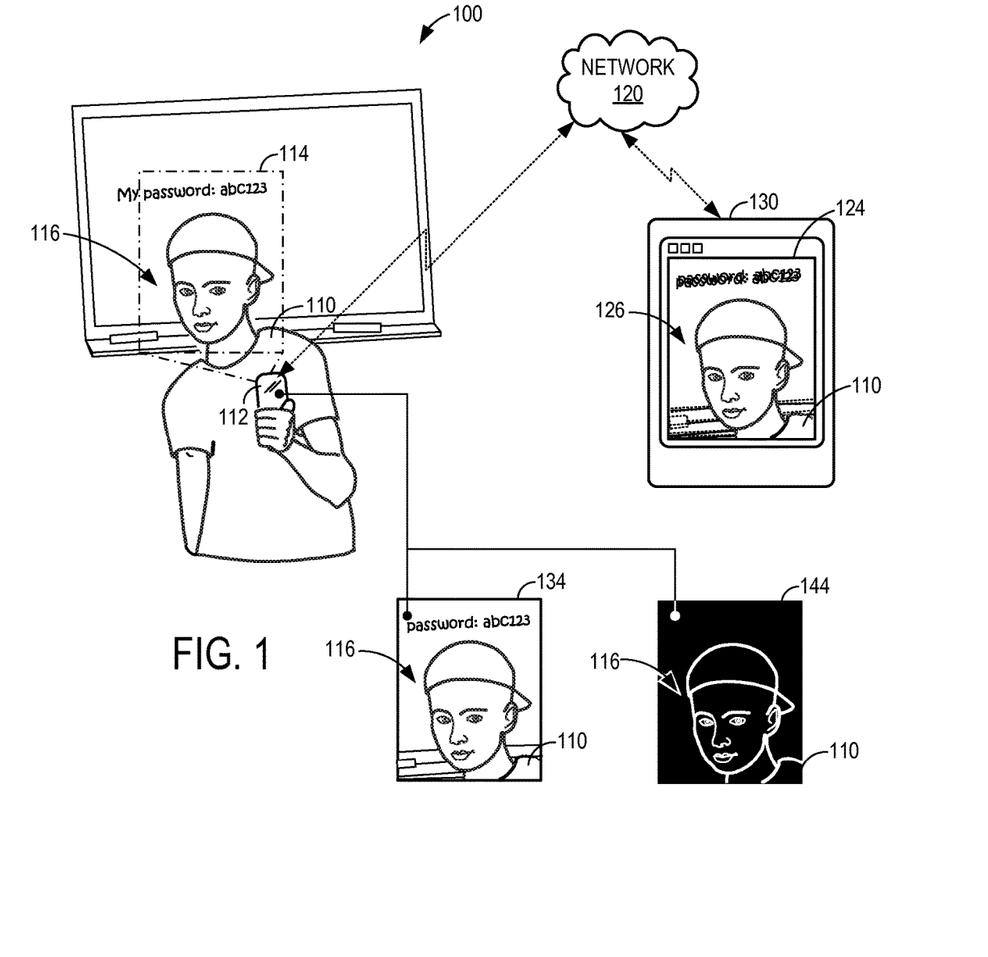
FIG. 1 depicts an example use-environment in which a scene is imaged for infrared and visible light.

The present disclosure is directed to distinguishing foreground from background within an image through the use of infrared (IR) imaging of a scene, even if using unstructured, diffuse IR and/or non-visible forms of near-IR illumination. FIG. 1 depicts an example use-environment 100 in which a scene is imaged for IR and visible light (VL).

Within use-environment 100, a user 110 operates a computing device 112 to capture an image or video of a scene 114. Computing device 112 takes the form of a hand-held mobile client computing device in this particular example (e.g., a smart phone). However, computing device 112 may take other suitable forms.

In this example, scene 114 includes user 110 or a portion of the user as a foreground component, and further includes a background component 116 located behind user 110. User 110 may operate computing device 112 to communicate with other computing devices such as example computing device 130 over a communications network 120. For example, user 110 may be engaged in a real-time video communication with another user over communications network 120. In an example implementation, user 110 transmits a modified version 124 of scene 114 as an image or video. In this example, background component 116 of scene 114 has been modified to obtain a modified background component 126. Modified background component 126 is depicted in FIG. 1 as a blurred version of background component 116. However, a background component may be modified in other ways as will be described herein, including replacement of the background component with different subject matter.

Scene 114 may be captured by computing device 112 using a variety of different techniques. As an example, scene 114 may be captured by computing device 112 as a visible light (VL) image 134 via a VL camera of computing device 112. A VL image may take the form of an RGB image or grayscale image, for example. Additionally, scene 114 may be captured by computing device 112 as an IR image 144 via an IR camera of computing device 112. The VL camera and IR camera of computing device 112 may take the form of a combined VL/IR camera or may instead form two distinct cameras of computing device 112.

Figure 2:
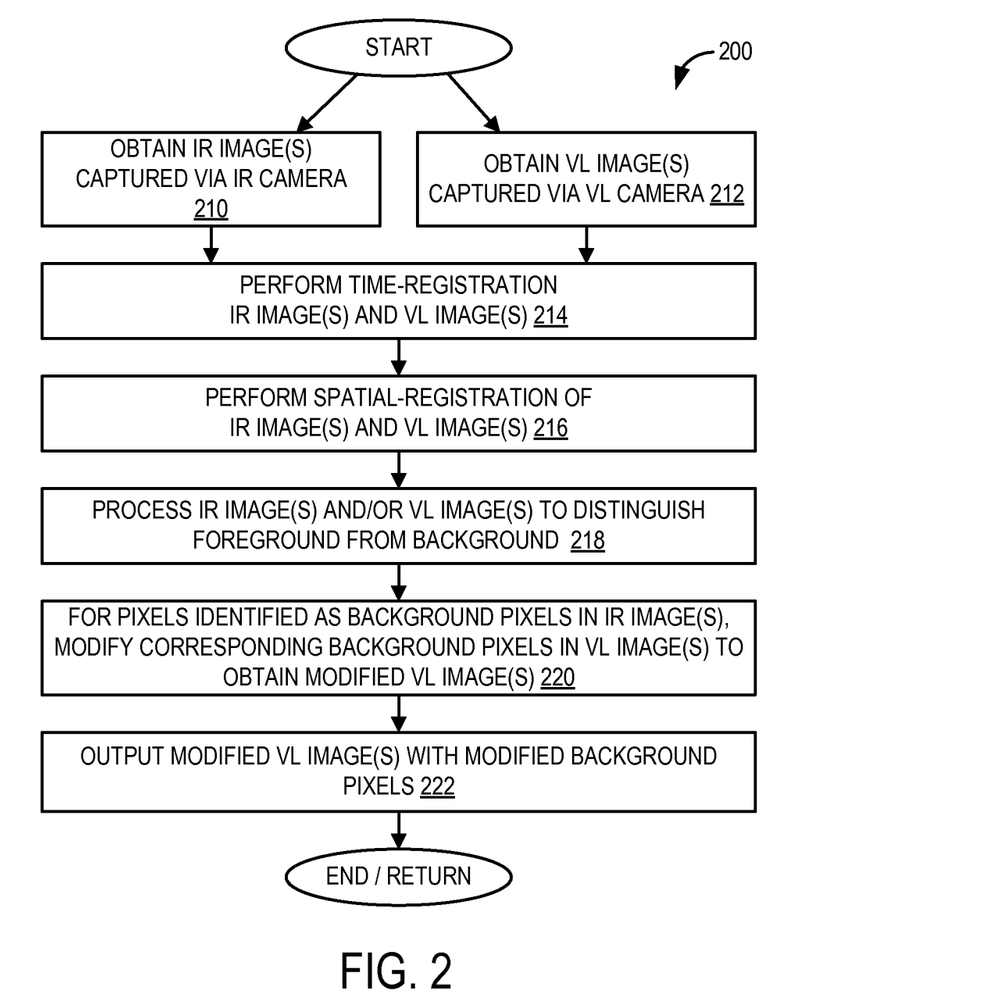
FIG. 2 is a flow diagram depicting an example imaging method for modifying a VL image by distinguishing foreground from background in a corresponding IR image.

FIG. 2 is a flow diagram depicting an example imaging method 200 for modifying a VL image by distinguishing foreground from background in a corresponding IR image. As previously described with reference to FIG. 1, VL and IR images may be processed to distinguish foreground and background components of a scene, which may enable modification of the background component. However, aspects of method 200 may be used in other contexts, such as for human body-part tracking within the context of a natural user interface. Furthermore, while method 200 does not require the use of a purpose-built three-dimensional (3D) camera, aspects of method 200 may be used to provide seed information to a 3D processing pipeline that processes images/video from a time-of-flight, structured light, or stereo 3D camera.

At 210, the method includes obtaining one or more IR images captured via an IR camera. An IR camera measures a relative IR (and/or non-visible, near-IR) light intensity within an observed scene for each pixel of the IR camera. The measured IR intensity at each pixel address in a two-dimensional (2D) matrix may be recorded as an IR intensity value (e.g., ranging from 0-255). An IR image obtained at 210 may be one of a plurality of IR images captured via the IR camera that collectively forms a time-based series of IR images. A time-based series of IR images may form an IR video, for example.

At 212, the method includes obtaining one or more VL images captured via a VL camera. A VL camera measures a relative visible light intensity in an observed scene for each pixel of the VL camera for one or more visible light channels, such as red, green, blue, grayscale, etc. For each channel, the channel-specific VL intensity at each pixel address in a 2D matrix may be recorded as a VL intensity value (e.g., ranging from 0-255 for that channel) c. A VL image obtained at 212 may be one of a plurality of VL images captured via the VL camera that collectively forms a time-based series of VL images. A time-based series of VL images may form a VL video, for example.

Each VL and IR image includes a two-dimensional arrangement (e.g., an array) of pixels. Each pixel of an image may be identified by a corresponding pixel identifier that enables that pixel to be distinguished from other pixels of the image. Each image, whether IR or VL, may be identified by a corresponding image identifier that enables that image to be distinguished from other images. An image identifier may further identify a relative position or timing of an image within a time-based series of images. In at least some implementations, IR images may be arranged in a time-based series of IR images based on their respective image identifiers. Similarly, VL images may be arranged in a time-based series of VL images based on their respective image identifiers. In at least some implementations, an image identifier may take the form of a metadata component of an image file that further contains the image.

IR images and VL images may be time-registered with each other based on their respective image identifiers and/or sequence to provide time-registered IR and VL videos. For example, at 214, the method includes performing time-registration of the one or more IR images and the one or more VL images. Each IR image may be time-registered with a corresponding VL image. In at least some implementations, time-registration may be performed by a registration module executed by a computing device.

In an example, time-registration of IR and VL images may include matching an identifier of an IR image to a corresponding identifier of a VL image. The identifier may include a time-based identifier component, such as a time-stamp, for example. In another example, IR and VL images may be time-registered with each other by referencing a relative order or position of each IR image within a time-based series of IR images with a corresponding order or position of each VL image within a time-based series of VL images. Time-registration may be performed for each corresponding pair of IR and VL images to form time-registered IR and VL videos.

In at least some implementations, IR and VL cameras may be spaced apart from each other in a physical dimension and/or may have a different vantage point. A different spacing and/or vantage point may result in parallax or spatial misalignment between the subject matter of the IR and VL images, even after time-registration. This parallax or spatial misalignment may not be present in camera systems that utilize the same camera or an identical vantage point to capture the IR and VL images.

To reduce or eliminate parallax or spatial misalignment between time-registered IR and VL images, at 216, the method includes performing spatial-registration of each time-registered pair of IR and VL images. In at least some implementations, spatial-registration may be dynamically performed by a registration module executed by a computing device. Instead of dynamic registration or as a seed to dynamic registration, an initial spatial registration may be inferred based on the known vantage points of the VL and IR cameras and the assumed distance of a subject imaged by the cameras. For example, an imaging distance of eighteen inches may be assumed based on an average distance that average users hold a smart phone from their faces.

When spatially registered, each IR image may be warped to be more closely aligned with a corresponding VL image by applying a spatial transform function to the IR image. A consistent spatial transform function may be applied to each IR and/or VL image based on known vantage points and assumed imaging distances, or spatial transforms may be dynamically adjusted based on one or more distance-estimating inputs (e.g., a previous frame assessment of distance). This process may be repeated for each pair of IR and VL images of a time-series to obtain a spatially-registered video.

In at least some implementations, the VL camera and IR camera may have the same resolutions, although identical resolutions are not necessarily required. Whether the cameras have the same or different resolutions, the pixels of the VL camera may be registered to the pixels of the IR camera in both physical space and time domains. In this way, VL and IR intensity information may be determined for each region of an observed scene by considering the corresponding registered pixels from the VL camera and the IR camera.

Data collected from VL and/or IR images may be arranged in virtually any suitable data structure(s), including but not limited to one or more matrices that include IR intensity values for every pixel imaged by the IR camera, and VL (e.g., red/green/blue color and/or grayscale) intensity values for every pixel imaged by the VL camera. While examples depicted by the drawings may include only a single frame of a VL or IR image, it is to be understood that a human subject within an observed scene may be continuously observed and modeled at any suitable rate (e.g., 30, 60, 120 frames per second). Accordingly, IR and/or VL data may be collected for each such observed frame. The collected data may be made available via one or more Application Programming Interfaces (APIs) and/or further analyzed as described below.

At 218, the method includes processing the IR image and/or the VL image to distinguish foreground from background. Processing at 218 may be performed according to the processing pipeline described in further detail with reference to FIGS. 3 and 4, for example. However, other suitable processing techniques may be used.

Processes 214, 216, and 218 of FIG. 2 may be performed in a different order and/or in parallel depending on implementation. For example, process 218 for distinguishing foreground from background may be performed before time-registration at 214 and/or before spatial-registration at 216. Accordingly, it will be understood that the processing order depicted in FIG. 2 is a non-limiting example of an imaging method.

At 220, the method includes for some or all of the pixels identified as background pixels within the one or more IR images, modifying corresponding background pixels in the one or more corresponding VL images to obtain one or more modified VL images.

Background pixels of an image may be modified using any suitable image processing technique or combination of techniques. As an example, modification may include applying one or more pre-defined filters to the background pixels. Such filters may modify relative and/or absolute color, contrast, intensity, etc. and/or arrangement of background pixels to provide an overall visual effect for the background component of the image. A non-limiting example includes modifying the background of a scene to be lighter or darker relative to the observed background. Another non-limiting example includes changing an observed multi-chromatic background to a monochromatic background.

Modifying background pixels may include blurring or replacing background pixels. Blurring and/or replacement of a background component of an image or video may enhance privacy with respect to objects located within the background component. For example, as depicted in FIG. 1, textual information (e.g., a password) and/or objects located in a background of a scene may be blurred to enhance privacy. Replacement of background pixels may also provide a green-screening effect in which objects located in the foreground appear to co-exist within the same scene with replacement background subject matter that does not actually exist in the imaged scene.

In at least some implementations, blurring background pixels of an image may include sampling a group of pixels surrounding a subject pixel, and adjusting a light intensity value of the subject pixel based on a combination (e.g., an average) of the sampled group of pixels. For background pixels located near or proximate foreground pixels, the combination of sampled pixels may take the form of a weighted average that excludes or reduces the impact of foreground pixels on the combination. This approach may serve to reduce the appearance of halos surrounding the foreground pixels.

In at least some implementations, replacement content for a background component of an image or video may be user-defined or otherwise selectable by the user. As an example, a user may capture or download a replacement VL image or video that is used to replace a background component of another image or video.

Modification of an image may be performed in layers. For example, an entire visible light image may be blurred to obtain a first layer of the modified image, and the foreground component forming a second layer may be overlaid onto the first layer to obscure the underlying blurred foreground component of the first layer. For replacement of a background component, such as to provide a green-screening effect, the entire replacement image may form a first layer that is overlaid with a second layer that includes the foreground component of the original image to obscure the underlying portion of the replacement image. In at least some implementations, modification of VL images may be performed by a VL image modification module executed by a computing device.

At 222, the method includes outputting the one or more VL images as one or more modified VL images having modified background pixels. Non-limiting examples of outputting the one or more modified VL images may include: (1) transmitting the one or more modified VL images to a storage device to be stored for later retrieval, (2) transmitting the one or more processed VL images to a graphical display for presentation, and/or (3) transmitting the one or more processed VL images to another computing device over a communications network.

Method 200 may be applied to a time-series of images to obtain a modified VL video. For example, method 200 may include obtaining a plurality of IR images captured via the IR camera and a plurality of VL images captured via the VL camera. Each VL image may be time-registered and spatially-registered with a corresponding IR image of the plurality of IR images. For each corresponding IR and VL image pair, pixels of the VL image may be modified based on the corresponding IR pixels being identified as background pixels. The plurality of VL images may be output as a modified VL video with each modified VL image having modified background pixels.

Figure 3:
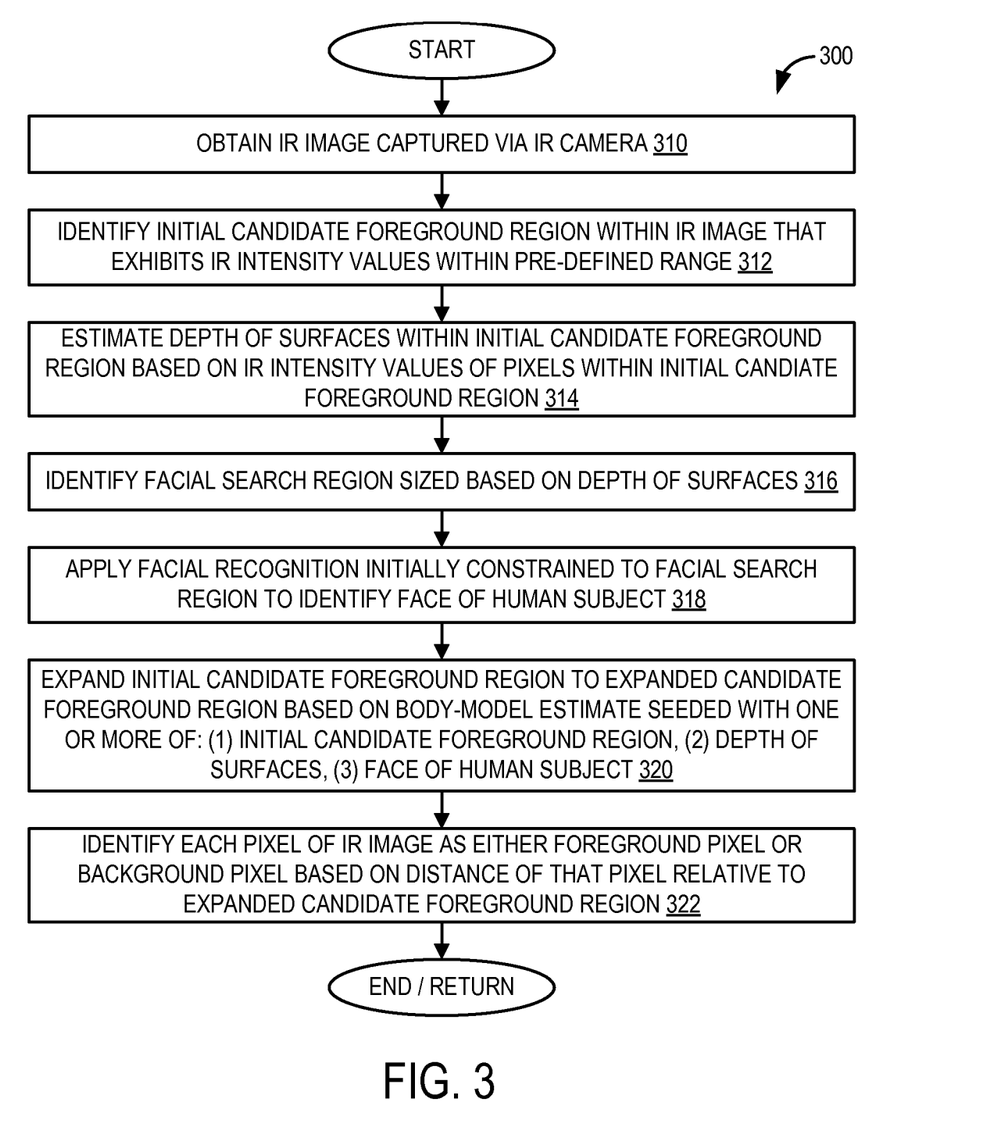
FIG. 3 is a flow diagram depicting an example imaging method for identifying foreground and background pixels within an infrared image.

FIG. 3 is a flow diagram depicting an example imaging method 300 for identifying foreground and background pixels within an infrared image. Method 300 is a non-limiting example of the processing that may be performed at process 218 of method 200 to distinguish foreground from background in an image.

At 310, the method includes obtaining an IR image, such as previously described with reference to process 210 of FIG. 2. In an example, the IR image is captured via an IR camera that observes an IR illuminated scene that includes one or more human subjects or portions of the one or more human subjects. The IR illumination may be unstructured and diffuse, for example. The IR image may be one of a plurality of time-series IR images forming an IR video captured by the IR camera. Each pixel of an IR image may include an associated IR intensity value.

For each IR image, at 312, the method includes identifying an initial candidate foreground region within the IR image that includes pixels exhibiting infrared intensity values within a pre-defined range. In an example, the initial candidate foreground region may be identified by comparing infrared intensity values of individual pixels of the infrared image to the pre-defined range to obtain a set of pixels that exhibit infrared intensity values within the pre-defined range.

In a further aspect of this example, an initial candidate foreground region may be identified if a threshold quantity of pixels or a threshold proportion of pixels exhibits IR intensity values within the pre-defined range, to thereby exclude small or isolated pixel regions from being identified as an initial candidate foreground region. The initial candidate foreground region identified at process 312 may be one of a plurality of initial candidate foreground regions within an individual IR image identified by process 312 of method 300.

As an example, the pre-defined range may include IR intensity values corresponding to human skin. Within this example, the pre-defined range may further include IR intensity values corresponding to human skin located within a range of depths from the IR camera that is illuminated by a defined infrared illumination condition. The range of depths may define far-field and/or near-field depth thresholds for segmenting foreground from background.

In at least some implementations, a pre-defined range may be one of a plurality of pre-defined ranges of IR intensity values. Two or more pre-defined ranges may correspond to IR intensity values that at least partially overlap with each other or such ranges may be non-overlapping depending on implementation. Multiple pre-defined ranges of IR intensity values may be used to accommodate different skin colors/tones (e.g., dark versus light skin) and/or similar skin color/tone located at different distance ranges from the IR camera.

In at least some implementations, the pre-defined range may be obtained by previous training of a machine learning algorithm on one or more human training subjects located within a range of depths from an infrared training camera that is illuminated by an IR illumination condition. Training of a machine learning algorithm may include measuring the IR response of skin for a variety of human subjects across a variety of depths. The human subjects may be selected so that the gamut of possible human skin tones is adequately represented. Typically, training is performed on multiple human subjects having diverse skin tones. However, less rigorous training may be performed depending on implementation. The measured IR responses may be associated with the depths at which reflected IR was measured from the human training subjects. The infrared training camera may be the same or equivalent model of infrared camera or camera system having the same or a substantially similar configuration as the infrared camera that captured the infrared image obtained at process 310, including an IR source that provides the same or similar IR illumination condition. Training may be used to obtain two or more pre-defined ranges of IR intensity values having partially overlapping or non-overlapping IR intensity values to accommodate a variety of different skin colors/tones and/or distance ranges.

In further implementations, as described with reference to FIG. 4, the pre-defined range of IR intensity values may be obtained by applying facial recognition to the infrared image or a portion thereof to identify a face of a human subject. One or more infrared intensity values may be measured from the face of the human subject. The pre-defined range may be set or updated based on the one or more infrared intensity values measured from the face of the human subject. This approach may be used in addition to or as an alternative to training of a machine learning algorithm. Further, additional and/or alternative approaches for selecting the pre-defined range may be used.

At 314, the method includes estimating a depth of surfaces within the initial candidate foreground region based on the IR intensity values of the pixels within the initial candidate foreground region. In at least some implementations, depth may be estimated for some or all of the pixels of the initial candidate foreground region at 314 by referencing a pre-defined relationship between individual IR intensity values and depth values. This pre-defined relationship may be obtained from the previous training of the machine learning algorithm for human skin across a range of depths for a given IR illumination condition, for example.

In the context of searching for a human subject within an IR image, the depth of surfaces estimated within the initial candidate foreground region provides an approximation of a distance of the human subject from the IR camera for a given IR illumination condition. This approximation of distance may be used to estimate a relative size of the human subject or a portion thereof within a frame of the IR image, and may be used to further constrain subsequent searches within the IR image or within a corresponding VL image.

For example, at 318, the method includes identifying a facial search region that is sized and/or positioned relative to the IR image based on the depth of surfaces estimated within the initial candidate foreground region. The facial search region may be sized to accommodate the estimated size of a face or head of a human subject for the depth of surfaces estimated within the initial candidate foreground region.

As an example, for greater estimated depths indicating that the human subject is located further from the IR camera, the identified facial search region may have a smaller size to accommodate the expected image size of the face at the greater depth while also limiting the size of the facial search region. Continuing with this example, for smaller estimated depths indicating the human subject is located closer to the IR camera, the identified facial search region may have a larger size to accommodate the expected image size of the face at the closer depth while also limiting the size of the facial search region.

In an example, the facial search region may be positioned to entirely surround or at least partially include the initial candidate foreground region. If two or more initial candidate foreground regions are identified at 312, a corresponding facial search region may be identified for each initial candidate foreground region that is sized and/or positioned for that initial candidate foreground region.

At 318, the method includes applying facial recognition initially constrained to the facial search region to identify a face of a human subject. Constraining facial recognition to the facial search region may significantly reduce the amount of computing resources and/or the amount of time for identifying a face of a human subject within the IR image.

Initially constraining facial recognition to the facial search region may include initially applying facial recognition within the facial search region. If a face of a human subject is identified within the facial search region, then facial recognition may not be applied to the IR image outside of that facial search region. However, if a face of a human subject is not identified within the facial search region, then facial recognition may be optionally applied to other regions of the IR image outside of the facial search region or facial recognition may be discontinued to constrain facial recognition exclusively to the facial search region.

At 320, the method includes expanding the initial candidate foreground region to an expanded candidate foreground region based on a body-model estimate. The body-model estimate may be used to approximate a location of other body portions of the human subject within a frame of the IR image. In at least some implementations, the body-model estimate may be seeded with one or more of: (1) the initial candidate foreground region identified at 312, (2) the depth of surfaces estimated within the initial candidate foreground region at 314, and/or (3) the face of the human subject identified at 318 (e.g., size, position, orientation, and/or identify (including known skin tone) of the face within the image).

At 322, the method includes identifying each pixel of the IR image as either a foreground pixel or a background pixel based on a distance of that pixel relative to the expanded candidate foreground region. In an example implementation, each pixel located within the expanded candidate foreground region may be identified as a foreground pixel, whereas each pixel located outside of the expanded candidate foreground region may be identified as either a foreground pixel or a background pixel based on a distance of that pixel relative to the expanded candidate foreground region. In this example, some or all of the pixels located outside of the expanded candidate foreground region may be identified as background pixels.

In at least some implementations, each pixel may be assigned a weighting based on a distance of that pixel from the expanded candidate foreground region. In an example where pixels are weighted in relation to foreground pixels, a greater weighting assigned to a pixel may correspond to a smaller distance from the expanded candidate foreground region, whereas a smaller weighting assigned to a pixel may correspond to a greater distance from the expanded candidate foreground region. In an example where pixels are weighted in relation to background pixels, a greater weighting assigned to a pixel may correspond to a greater distance from the expanded candidate foreground region, whereas a smaller weighting assigned to a pixel may correspond to a smaller distance from the expanded candidate foreground region.

In at least some implementations, distance may be measured as a shortest geodesic distance or as a shortest Euclidean distance between a subject pixel and a closest pixel of the expanded candidate foreground region. A geodesic distance may follow the smallest gradient in light intensity among pixels located between a subject pixel and a closest pixel of the expanded candidate foreground region. The geodesic distance may be measured with respect to gradients of IR intensity of an IR image and/or VL intensity of a VL image registered to that IR image.

In addition to distance-based weighting or as an alternative thereto, identifying each pixel of the IR image as either a foreground pixel or a background pixel may be based on a prior determination of that pixel (i.e., the same pixel position) in a previous frame. For a pixel identified as a foreground pixel in a previous frame, that pixel may be weighted toward a foreground pixel in the current frame. For a pixel identified as a background pixel in a previous frame, that pixel may be weighted toward a background pixel in the current frame. Weighting pixels based on their prior determination in a previous frame serves to reduce the number or frequency of changes between foreground and background pixels among a time-series of images. Accordingly, the use of prior determinations of background and foreground pixels between frames may be used to reduce the appearance of flicker in a time-based series of modified VL images in which background pixels have been modified.

In examples in which weightings are used, each pixel of the infrared image may be identified as either a foreground pixel or a background pixel based, at least in part, on a weighting assigned to that pixel. A weighting assigned to a pixel based on a prior determination of that pixel in a previous frame may be combined with a weighting assigned to that pixel based on distance to determine whether that pixel is a foreground pixel or a background pixel. However, such weightings may be used individually or in combination with one or more weightings based on other factors to distinguish background from foreground pixels.

Other suitable techniques may be used to identify a pixel as either a foreground or background pixel. In an example, the process of identifying each pixel as either a foreground pixel or a background pixel at 322 may be additionally or alternatively based on a probability determined for that pixel. Probability may be determined for each pixel by computing a foreground histogram for the foreground region and a background histogram for the background region, and using both histograms to compute a probability of a new pixel being a foreground pixel or a background pixel.

Method 300 may further include the use of other forms of computer vision to alter the size and/or shape of the expanded candidate foreground region. As an example, edge detection and/or shape recognition may be applied to IR images and/or their registered VL images to vary the size or shape of the expanded candidate foreground region relative to the body-model estimate to more closely conform to the bounds of the human subject's observed body, clothing, hair, etc.

Figure 4:
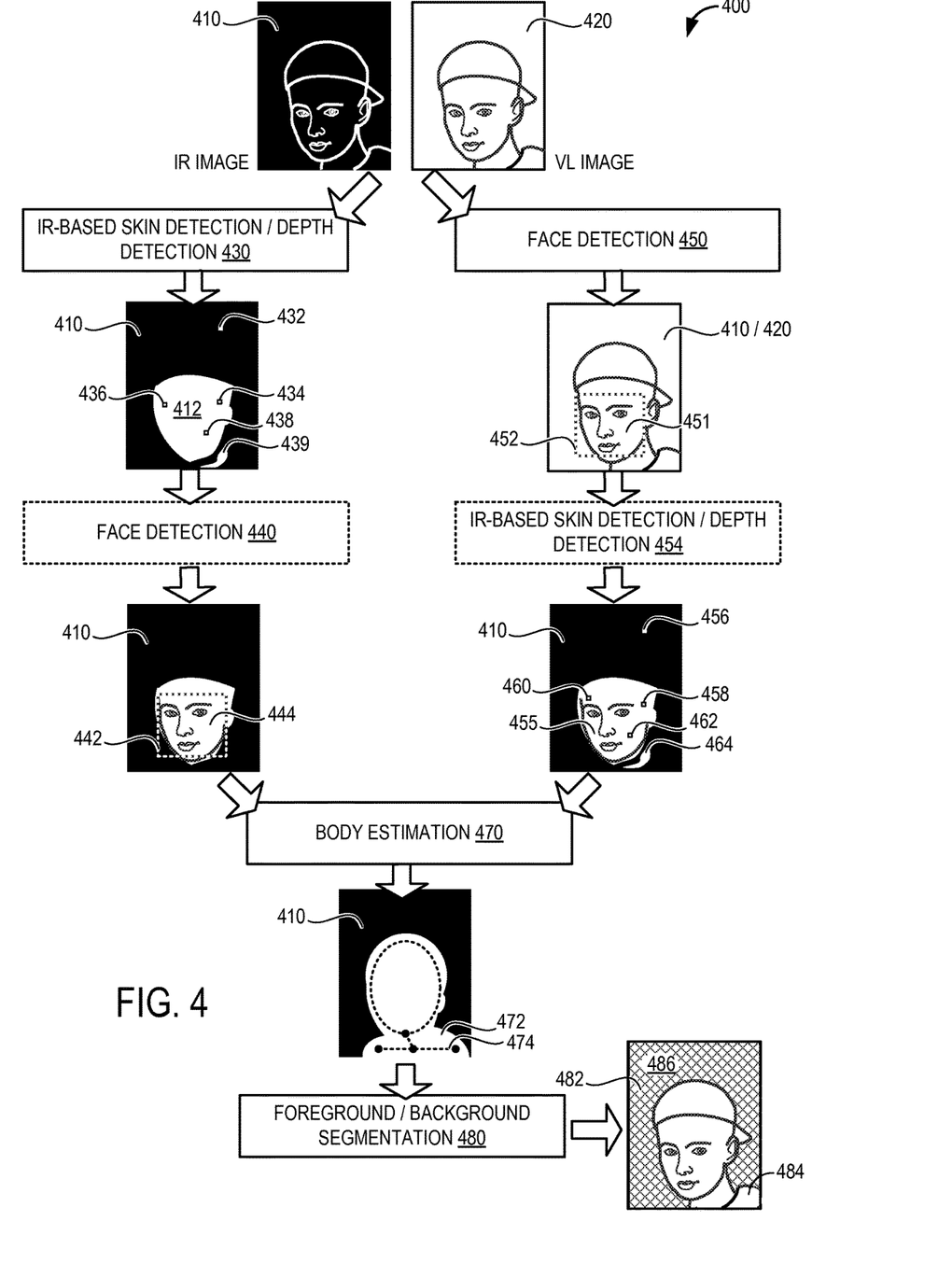
FIG. 4 is a schematic diagram depicting an example processing pipeline for identifying foreground and background pixels within an infrared image.

FIG. 4 is a schematic diagram depicting an example processing pipeline 400 for identifying foreground and background pixels within an infrared image. Processing pipeline 400 is a non-limiting example of an application of method 300 of FIG. 3 and process 218 of FIG. 2. The process flow through pipeline 400 may take several different paths, depending on implementation.

In a first example, IR-based skin detection and/or IR-based depth detection may be performed prior to and in series with face detection. In this first example, IR-based skin detection and/or IR-based depth detection is performed at 430 on IR image 410 to identify an initial candidate foreground region 412. The initial candidate foreground region may provide a seed for subsequent face detection. This aspect of pipeline 400 may correspond to previously described process 312 of FIG. 3. In at least some implementations, IR-based skin detection may be performed by an IR depth-skin module executed by a computing device.

Examples of individual pixels of IR image 410 are depicted in FIG. 4, in which pixel 432 has an IR intensity value that is outside of the pre-defined range of IR intensity values corresponding to human skin within a depth range, and hence is omitted from initial candidate foreground region 412. By contrast, pixels 434, 436, and 438 located within initial candidate foreground region 412 exhibit IR reflective values that are within the pre-defined range.

As part of IR-based skin detection and/or IR-based depth detection performed at 430, the depth of surfaces within initial candidate foreground region 412 are estimated based, in part, on IR intensity values measured at pixels 434, 436, and 438. This aspect of pipeline 400 may correspond to previously described process 314 of FIG. 3. In at least some implementations, IR-based depth detection may be performed by an IR depth-detection module executed by a computing device.

FIG. 4 further depicts an example in which infrared image 410 includes another initial candidate foreground region 439 in addition to previously described region 412. In this example, region 412 corresponds to a facial region of the human subject and region 439 corresponds to a neck region of the human subject. In other examples, an infrared image may include two or more human subjects, with each human subject being identified by one or more initial candidate foreground regions.

Continuing with this first example, face detection is optionally performed at 440 in which a bounding box of a facial search region 442 is sized and/or positioned relative to initial candidate foreground region 412 based on the estimated depth of surfaces within the initial candidate foreground region. Facial recognition is then performed within the facial search region to identify a face 444 of the human subject. This aspect of pipeline 400 may correspond to previously described processes 316 and 318 of FIG. 3. In at least some implementations, face detection may be performed by a face detection module executed by a computing device that includes a facial recognition component. In some examples, face detection at 440 may be omitted from the process flow.

In a second example, face detection may be performed before and in series with IR-based skin detection and/or IR-based depth detection. In this second example, face detection may be performed at 450 on IR image 410 to identify a face of a human subject indicated at 451. Alternatively or additionally, face detection may be performed at 450 on a corresponding VL image 420 registered with IR image 410 to identify the face of the human subject based on VL intensity values. Faces identified within a VL image may be translated, by way of registration, to corresponding pixels of a registered IR image, or vice-versa.

In at least some implementations, face detection may be used to estimate a depth of the face of the human subject prior to IR-based skin detection and/or IR-based depth detection. As an example, a depth of the face may be estimated based on a measured distance of or between features of the face, such as the eyes, nose, mouth, ears, cheeks, etc. In this context, distance between features of the face may be measured based on pixel quantity and/or based on a comparison to a frame size of the image. A distance measured between features of the face may then be compared to a face-model, which optionally may be saved as part of a profile corresponding to an identified face, to obtain an estimate of depth of the face within the image.

IR-based skin detection and/or IR-based depth detection may be optionally performed at 454 on IR image 410 to identify an initial candidate foreground region 455. The location of the face within the IR image and/or an estimated depth of the face previously obtained at 450 may be subsequently used as a seed by IR-based skin detection and/or IR-based depth detection at 454.

As an example, IR-based skin detection may be at least initially constrained to face 451 or a facial region 452 surrounding the face. As another example, the pre-defined range of IR intensity values for identifying the initial candidate foreground region may be set or updated based on IR intensity values measured at the face. In this example, IR intensity values may be measured, for example, at pixels 458, 460, and 462 located at face 451 previously identified by face detection 450. The IR intensity values may be used to set or update the pre-defined range of IR intensity values for additional searching outside of the face or facial region. For example, an IR intensity value of example pixel 456 may be compared to the pre-defined range. In the example depicted in FIG. 4, pixel 456 does not exhibit an IR intensity that is within the pre-defined range, and is therefore excluded from initial candidate foreground region 455. FIG. 4 further depicts an example in which infrared image 410 includes an additional initial candidate foreground region 464 that was identified through IR-based skin detection.

In a third example, IR-based skin detection and/or depth detection at 430 may be performed in parallel with face detection at 450. In this example, skin, depth, and/or face detection may be performed independently of each other to provide seeds for a body estimate. Here, the use of face detection 440 and IR-based skin detection and/or IR based depth detection 454 in series may be omitted from pipeline 400.

Body estimation may be performed at 470 to obtain an expanded initial candidate foreground region 472 obtained by any of the previously described process flows of pipeline 400. As an example, expanded initial candidate foreground region 472 may be based on a body-model estimate seeded with one or more of: (1) initial candidate foreground region(s) 412, 439, 455, 464, etc., (2) depth of surfaces identified by IR-based depth detection and/or face detection (including a depth of faces obtained by face detection 450), and/or (3) faces of human subjects identified by face detection. In at least some implementations, a body-model may include a skeletal frame 474 that is sized and/or positioned relative to the initial candidate foreground region and/or face of the human subject. This aspect of pipeline 400 may correspond to previously described process 320 of FIG. 3. In at least some implementations, body estimation may be performed by a body estimation module executed by a computing device.

Foreground and background segmentation may be performed at 480 to distinguish foreground from background in the IR image and/or the corresponding VL image based on the expanded candidate foreground region. As previously described, probability may be assigned to individual pixels based on distance from the expanded candidate foreground region. Additionally or alternatively, various computer vision techniques may be used to expand or contract the size and/or shape of the expanded candidate foreground region, such as by applying edge detection, shape recognition, etc. to IR images and/or the corresponding VL images registered to the IR images.

In at least some implementations, the methods and processes described herein may be tied to a computing system of one or more computing devices. In particular, such methods and processes may be implemented as a computer-application program or service, an application-programming interface (API), a library, and/or other computer-program product.

As a non-limiting example, the processing techniques described herein with respect to distinguishing foreground from background in an image may be performed by a client computing device operated by a user. As another non-limiting example, such processing techniques may be performed by a server computer or server system implementing a service that receives images from a client computing device over a communications network and performs one or more of the processes described herein. In an example, this service may take the form of a hosted communications service that facilitates image and/or video communications between two or more client computing devices over a communications network. As yet another non-limiting example, such processing techniques may be distributed between or among a client computing device and a server computer or server system.

Figure 5:
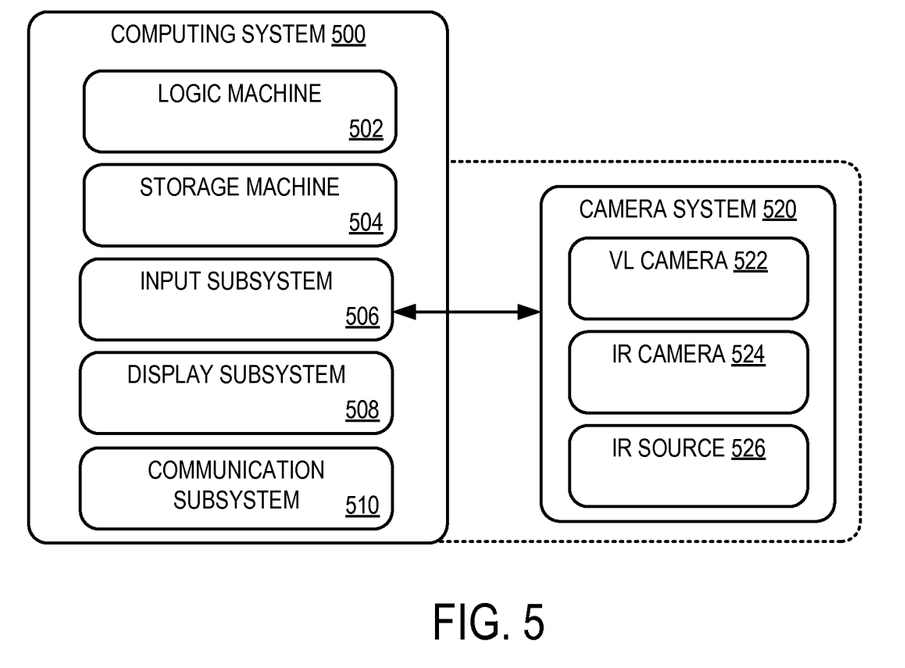
FIG. 5 is a schematic diagram depicting an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504. Computing system 500 may optionally include a input subsystem 506, a display subsystem 508, a communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

As a non-limiting example, instructions held by storage machine 504 and executable by logic machine 502 may include one or more of the previously described modules, including: (1) an IR-based skin detection module, (2) an IR-based depth detection module, (3) a face detection module, (4) a body estimation module, (5) a segmentation module, (6) a registration module, and/or (7) a VL image modification module.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 508 may be used to present a visual representation of data held by storage machine 504. This visual representation may take the form of a graphical user interface (GUI). As the herein described methods and processes change the data held by the storage machine, and thus transform the state of the storage machine, the state of display subsystem 508 may likewise be transformed to visually represent changes in the underlying data. Display subsystem 508 may include one or more display devices utilizing virtually any type of technology. Such display devices may be combined with logic machine 502 and/or storage machine 504 in a shared enclosure, or such display devices may be peripheral display devices.

When included, input subsystem 506 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, VL/color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

FIG. 5 further depicts a non-limiting example of a user-input device in the form of a camera system 520 that may form part of or interface with input subsystem 506. Camera system 520 includes a VL camera 522, an IR camera 524, and an IR source 526. While VL camera 522 and infrared camera 524 are depicted as independent or distinct cameras in FIG. 5, in at least some implementations, a combined camera may serve as both VL camera 522 and IR camera 524. In such case, VL camera 522 and IR camera 524 may be co-located and/or integrated into a common camera. IR source 526 may include one or more IR and/or near-IR light sources to illuminate a scene captured by IR camera 524. In at least some implementations, IR source 526 provides non-structured, diffuse IR and/or near-IR illumination.

When included, communication subsystem 510 may be configured to communicatively couple computing system 500 with one or more other computing devices. Communication subsystem 500 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

In one example, an imaging method includes obtaining an infrared image captured via an infrared camera, identifying an initial candidate foreground region within the infrared image that includes pixels exhibiting infrared intensity values within a pre-defined range, estimating a depth of surfaces within the initial candidate foreground region based on infrared intensity values of the pixels within the initial candidate foreground region, and expanding the initial candidate foreground region to an expanded candidate foreground region based on a body-model estimate seeded with the initial candidate foreground region and the depth of surfaces estimated within the initial candidate foreground region. In one example, the imaging method further includes identifying each pixel of the infrared image as either a foreground pixel or a background pixel based on a distance of that pixel relative to the expanded candidate foreground region. In an example, the imaging method further includes obtaining a visible light image captured via a visible light camera that is time-registered and spatially-registered with the infrared image, and for some or all of the pixels of the infrared image identified as background pixels, modifying corresponding background pixels in the visible light image. In one example, the imaging method further includes obtaining a plurality of infrared images captured via the infrared camera, wherein the infrared image is one of the plurality of infrared images, obtaining a plurality of visible light images captured via the visible light camera, wherein each visible light image is time-registered and spatially-registered with a corresponding infrared image of the plurality of infrared images, for each infrared image of the plurality of infrared images, and for some or all of the pixels of that infrared image identified as background pixels, modifying corresponding background pixels in a visible light image that is time-registered and spatially registered with that infrared image, and outputting the plurality of visible light images as a visible light video with each visible light image having modified background pixels. In one example, within the imaging method, each pixel located within the expanded candidate foreground region is identified as a foreground pixel, and some or all of the pixels located outside of the expanded candidate foreground region are identified as background pixels. In one example, the imaging method further includes weighting each pixel as either a foreground pixel or a background pixel based on a distance of that pixel from the expanded candidate foreground region, identifying each pixel of the infrared image as either a foreground pixel or a background pixel based, at least in part, on a weighting assigned to that pixel, in which the distance is a geodesic distance that follows a smallest gradient in light intensity among pixels located between each pixel and a closest pixel of the expanded candidate foreground region. In one example, the imaging method further includes weighting each pixel as either a foreground pixel or a background pixel based on a prior determination for that pixel in a previous frame, and identifying each pixel of the infrared image as either a foreground pixel or a background pixel based, at least in part, on a weighting assigned to that pixel. In one example, within the imaging method, the pre-defined range includes infrared intensity values corresponding to human skin located within a depth range from the infrared camera that is illuminated by an infrared illumination condition. In one example, within the imaging method, the pre-defined range is obtained by previous training of a machine learning algorithm on one or more human training subjects located within the depth range from an infrared training camera that is illuminated by the infrared illumination condition. In one example, within the imaging method, identifying the initial candidate foreground region includes comparing infrared intensity values of individual pixels of the infrared image to the pre-defined range to obtain a set of pixels that exhibit infrared intensity values within the pre-defined range. In one example, within the imaging method, the initial candidate foreground region is one of a plurality of initial candidate foreground regions, in which each of the plurality of initial candidate foreground regions includes a threshold quantity or threshold proportion of pixels that exhibit infrared intensity values within the pre-defined range. In one example, the imaging method further includes applying facial recognition to the infrared image to identify a face of a human subject, measuring one or more infrared intensity values from the face of the human subject, and setting the pre-defined range based on the one or more infrared intensity values measured from the face of the human subject.

In one example, an imaging method includes obtaining an infrared image of an infrared illuminated scene captured via an infrared camera, identifying an initial candidate foreground region within the infrared image that includes pixels exhibiting infrared intensity values within a pre-defined range, estimating a depth of surfaces within the initial candidate foreground region based on infrared intensity values of the pixels within the initial candidate foreground region, identifying a facial search region that is sized based on the depth of surfaces estimated within the initial candidate foreground region, applying facial recognition initially constrained to the facial search region to identify a face of a human, expanding the initial candidate foreground region to an expanded candidate foreground region based on a body-model estimate seeded with the face of the human subject, and identifying each pixel of the infrared image as either a foreground pixel or a background pixel based on a distance of that pixel relative to the expanded candidate foreground region. In one example, the imaging method further includes obtaining a visible light image captured via a visible light camera that is time-registered and spatially-registered with the infrared image, and for some or all of the pixels of the infrared image identified as background pixels, modifying corresponding background pixels in the visible light image. In one example, the imaging method further includes determining a weighting for each pixel being a foreground pixel based on a distance of that pixel relative to the expanded candidate foreground region, in which identifying each pixel as either a foreground pixel or a background pixel is based on the weighting determined for that pixel, and the weighting determined for each pixel being a foreground pixel is greater if that pixel is closer to the expanded candidate foreground region and is smaller if that pixel is further from the expanded candidate foreground region. In one example, within the imaging method, the distance is a geodesic distance that follows a smallest gradient in light intensity among pixels located between each pixel and a closest pixel of the expanded candidate foreground region. In one example, within the imaging method, each pixel located within the expanded candidate foreground region is identified as a foreground pixel, and some or all of the pixels located outside of the expanded candidate foreground region are identified as background pixels. In one example, within the imaging method, the pre-defined range includes infrared intensity values corresponding to human skin located within a depth range from the infrared camera that is illuminated by an infrared illumination condition. In one example, within the imaging method, the pre-defined range is obtained by previous training of a machine learning algorithm on one or more human training subjects located within the depth range from an infrared training camera that is illuminated by the infrared illumination condition.

In one example, a computing system includes a camera system to capture infrared images forming an infrared video and visible light images forming a visible light video, the infrared images being registered with the visible light images, a logic machine to execute instructions, and a storage machine holding instructions executable by the logic machine to: for each infrared image captured via the infrared camera, identify an initial candidate foreground region within that infrared image that exhibits infrared intensity values within a pre-defined range, estimate a depth of surfaces within the initial candidate foreground region based on infrared intensity values of corresponding pixels of that infrared image, expand the initial candidate foreground region to an expanded candidate foreground region based on a body-model estimate seeded with the initial candidate foreground region and the depth of surfaces estimated within the initial candidate foreground region, identify each pixel of that infrared image as either a foreground pixel or a background pixel based on a distance of that pixel relative to the expanded candidate foreground region, for some or all of the pixels of that infrared image identified as background pixels, modify corresponding background pixels in a visible light image of the plurality of visible light images that is time-registered and spatially registered with that infrared image, and output the plurality of visible light images as the visible light video with each visible light image having modified background pixels.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An imaging method, comprising:
   obtaining an infrared image captured via an infrared camera;
   identifying an initial candidate foreground region within the infrared image that includes pixels exhibiting infrared intensity values within a pre-defined range;
   estimating depth values of surfaces within the initial candidate foreground region of the infrared image based on infrared intensity values of the pixels within the initial candidate foreground region of the infrared image; and
   expanding the initial candidate foreground region to an expanded candidate foreground region based on a body-model estimate seeded with the initial candidate foreground region and the depth values of the surfaces estimated within the initial candidate foreground region.

2. The method of claim 1, further comprising:
   identifying each pixel of the infrared image as either a foreground pixel or a background pixel based on a distance of that pixel relative to the expanded candidate foreground region.

3. The method of claim 2, further comprising:
   obtaining a visible light image captured via a visible light camera that is time-registered and spatially-registered with the infrared image; and
   for some or all of the pixels of the infrared image identified as background pixels, modifying corresponding background pixels in the visible light image.

4. The method of claim 3, further comprising:
   obtaining a plurality of infrared images captured via the infrared camera, wherein the infrared image is one of the plurality of infrared images;
   obtaining a plurality of visible light images captured via the visible light camera, wherein each visible light image is time-registered and spatially-registered with a corresponding infrared image of the plurality of infrared images;
   for each infrared image of the plurality of infrared images, and for some or all of the pixels of that infrared image identified as background pixels, modifying corresponding background pixels in a visible light image that is time-registered and spatially registered with that infrared image; and
   outputting the plurality of visible light images as a visible light video with each visible light image having modified background pixels.

5. The method of claim 2, wherein each pixel located within the expanded candidate foreground region is identified as a foreground pixel, and some or all of the pixels located outside of the expanded candidate foreground region are identified as background pixels.

6. The method of claim 2, further comprising:
   weighting each pixel as either a foreground pixel or a background pixel based on a distance of that pixel from the expanded candidate foreground region;
   identifying each pixel of the infrared image as either a foreground pixel or a background pixel based, at least in part, on a weighting assigned to that pixel; and
   wherein the distance is a geodesic distance that follows a smallest gradient in light intensity among pixels located between each pixel and a closest pixel of the expanded candidate foreground region.

7. The method of claim 1, further comprising:
   weighting each pixel as either a foreground pixel or a background pixel based on a prior determination for that pixel in a previous frame; and
   identifying each pixel of the infrared image as either a foreground pixel or a background pixel based, at least in part, on a weighting assigned to that pixel.

8. The method of claim 1, wherein the pre-defined range includes infrared intensity values corresponding to human skin located within a depth range from the infrared camera that is illuminated by an infrared illumination condition.

9. The method of claim 8, wherein the pre-defined range is obtained by previous training of a machine learning algorithm on one or more human training subjects located within the depth range from an infrared training camera that is illuminated by the infrared illumination condition.

10. The method of claim 1, wherein identifying the initial candidate foreground region includes comparing infrared intensity values of individual pixels of the infrared image to the pre-defined range to obtain a set of pixels that exhibit infrared intensity values within the pre-defined range.

11. The method of claim 10, wherein the initial candidate foreground region is one of a plurality of initial candidate foreground regions, in which each of the plurality of initial candidate foreground regions includes a threshold quantity or threshold proportion of pixels that exhibit infrared intensity values within the pre-defined range.

12. The method of claim 1, further comprising:
   applying facial recognition to the infrared image to identify a face of a human subject;
   measuring one or more infrared intensity values from the face of the human subject; and
   setting the pre-defined range based on the one or more infrared intensity values measured from the face of the human subject.

13. An imaging method, comprising:
   obtaining an infrared image of an infrared illuminated scene captured via an infrared camera;
   identifying an initial candidate foreground region within the infrared image that includes pixels exhibiting infrared intensity values within a pre-defined range;
   estimating depth values of surfaces within the initial candidate foreground region of the infrared image based on infrared intensity values of the pixels within the initial candidate foreground region of the infrared image;

identifying a facial search region that is sized based on the depth values of the surfaces estimated within the initial candidate foreground region;

applying facial recognition initially constrained to the facial search region to identify a face of a human subject;

expanding the initial candidate foreground region to an expanded candidate foreground region based on a body-model estimate seeded with the face of the human subject; and identifying each pixel of the infrared image as either a foreground pixel or a background pixel based on a distance of that pixel relative to the expanded candidate foreground region;

obtaining a visible light image that is registered with the infrared image; and for some or all of the pixels of the infrared image identified as background pixels, blurring registered background pixels in the visible light image.

14. The method of claim 13, further comprising:

determining a weighting for each pixel being a foreground pixel based on a distance of that pixel relative to the expanded candidate foreground region;

wherein identifying each pixel as either a foreground pixel or a background pixel is based on the weighting determined for that pixel; and wherein the weighting determined for each pixel being a foreground pixel is greater if that pixel is closer to the expanded candidate foreground region and is smaller if that pixel is further from the expanded candidate foreground region.

15. The method of claim 14, wherein the distance is a geodesic distance that follows a smallest gradient in light intensity among pixels located between each pixel and a closest pixel of the expanded candidate foreground region.

16. The method of claim 13, wherein each pixel located within the expanded candidate foreground region is identified as a foreground pixel, and some or all of the pixels located outside of the expanded candidate foreground region are identified as background pixels.

17. The method of claim 13, wherein the pre-defined range includes infrared intensity values corresponding to human skin located within a depth range from the infrared camera that is illuminated by an infrared illumination condition.

18. The method of claim 16, wherein the pre-defined range is obtained by previous training of a machine learning algorithm on one or more human training subjects located within the depth range from an infrared training camera that is illuminated by the infrared illumination condition.

19. A computing system, comprising:

a camera system to capture infrared images forming an infrared video and visible light images forming a visible light video, the infrared images being registered with the visible light images;

a logic machine to execute instructions; and a storage machine holding instructions executable by the logic machine to:

for each infrared image captured via the infrared camera, identify an initial candidate foreground region within that infrared image that exhibits infrared intensity values within a pre-defined range, estimate depth values of surfaces within the initial candidate foreground region of the infrared image based on infrared intensity values of corresponding pixels of that infrared image, expand the initial candidate foreground region to an expanded candidate foreground region based on a body-model estimate seeded with the initial candidate foreground region and the depth values of the surfaces estimated within the initial candidate foreground region, identify each pixel of that infrared image as either a foreground pixel or a background pixel based on a distance of that pixel relative to the expanded candidate foreground region, for some or all of the pixels of that infrared image identified as background pixels, modify corresponding background pixels in a visible light image of the plurality of visible light images that is time-registered and spatially registered with that infrared image, and output the plurality of visible light images as the visible light video with each visible light image having modified background pixels.

20. The method of claim 1, further comprising:

providing unstructured, diffuse infrared illumination of a scene via an infrared source; and wherein the infrared image captured via the infrared camera is of the scene provided with the unstructured, diffuse infrared illumination by the infrared source.

\* \* \* \* \*